(12) United States Patent
May et al.

(10) Patent No.: US 7,446,561 B2
(45) Date of Patent: Nov. 4, 2008

(54) I/O CIRCUITRY SHARED BETWEEN PROCESSOR AND PROGRAMMABLE LOGIC PORTIONS OF AN INTEGRATED CIRCUIT

(75) Inventors: Roger May, Bicester (GB); Igor Kostarnov, Terriers (GB); Edward H Flaherty, Kingston Bagpiuae (GB); Mark Dickinson, Brill (GB)

(73) Assignee: Altera Corporation, San Jose, CA (US)

( * ) Notice: Subject to any disclaimer, the term of this patent is extended or adjusted under 35 U.S.C. 154(b) by 115 days.

(21) Appl. No.: 11/283,402

(22) Filed: Nov. 17, 2005

(65) Prior Publication Data

US 2006/0186917 A1 Aug. 24, 2006

Related U.S. Application Data

(63) Continuation of application No. 10/936,878, filed on Sep. 8, 2004, now Pat. No. 6,980,024, which is a continuation of application No. 09/880,458, filed on Jun. 12, 2001, now Pat. No. 6,803,785.

(60) Provisional application No. 60/211,094, filed on Jun. 12, 2000.

(51) Int. Cl.
*H03K 19/177* (2006.01)
(52) U.S. Cl. ............................. 326/39; 326/41; 326/38
(58) Field of Classification Search ............. 326/38–41; 714/724, 725
See application file for complete search history.

(56) References Cited

U.S. PATENT DOCUMENTS

| | | | |
|---|---|---|---|
| 4,488,259 A | 12/1984 | Mercy | |
| 4,617,479 A | 10/1986 | Hartmann et al. | |
| 4,710,927 A | 12/1987 | Miller | |
| 4,871,930 A | 10/1989 | Wong et al. | |
| 5,241,224 A | 8/1993 | Pedersen et al. | |
| 5,258,668 A | 11/1993 | Cliff et al. | |
| 5,260,610 A | 11/1993 | Pedersen et al. | |

(Continued)

OTHER PUBLICATIONS

Aitken, R.C., et al. "A Diagnosis Method Using Pseudo-Random Vectors Without Intermediate Signatures," Proc. Of Int. conf. On Computer-Aided Design (ICCAD), IEEE pp. 574-577 (1989).

(Continued)

*Primary Examiner*—Vibol Tan
(74) *Attorney, Agent, or Firm*—Ropes & Gray LLP; Jeffrey H. Ingerman

(57) ABSTRACT

The present invention provides circuitry and methods for sharing I/O pins between a programmable logic portion and an embedded processor portion of a chip. The circuits in the programmable logic portion and the embedded processor portion can access data signals from and send data signals to the same I/O pins. The data signals are multiplexed to control access to the shared I/O pins. The multiplexers may be controlled by a control signal that determines when particular I/O pins are accessed by the programmable logic portion and the embedded processor portion. Control signals that configure the associated I/O pin circuitry to the correct I/O standard are also multiplexed by the shared I/O circuitry of the present invention. Signals received at the shared I/O pins that are transmitted to the embedded processor portion may be concurrently sent to snoop circuitry within the programmable logic portion.

14 Claims, 6 Drawing Sheets

U.S. PATENT DOCUMENTS

| | | | |
|---|---|---|---|
| 5,260,611 | A | 11/1993 | Cliff et al. |
| 5,347,181 | A | 9/1994 | Ashby et al. |
| 5,412,260 | A | 5/1995 | Tsui et al. |
| 5,430,734 | A | 7/1995 | Gilson et al. |
| 5,436,575 | A | 7/1995 | Pedersen et al. |
| 5,550,782 | A | 8/1996 | Cliff et al. |
| 5,724,502 | A | 3/1998 | Cherichetti et al. |
| 5,790,479 | A | 8/1998 | Conn |
| 5,954,824 | A | 9/1999 | Cherichetti et al. |
| 5,982,195 | A * | 11/1999 | Cliff et al. ............... 326/41 |
| 5,999,015 | A | 12/1999 | Cliff et al. |
| 6,097,211 | A | 8/2000 | Couts-Martin et al. |
| 6,150,837 | A * | 11/2000 | Beal et al. ............... 326/39 |
| 6,233,205 | B1 | 5/2001 | Wells et al. |
| 6,260,087 | B1 | 7/2001 | Chang |
| 6,721,840 | B1 | 4/2004 | Allegrucci |
| 6,757,846 | B1 * | 6/2004 | Murray et al. ............ 714/34 |
| 6,803,785 | B1 | 10/2004 | May et al. |

OTHER PUBLICATIONS

Altera, "APEX 20K Programmable Logic Device Family Data Sheet," May 1999.

Altera, "FLEX 10K Embedded Programmable Logic Family Data Sheet," May 1999.

Altera, "FLEX 8000 Programmable Logic Family Data Sheet," May 1999.

Altera, "IEEE 1149.1(JTAG) Boundary-Scan Testing in Altera Devices," Aug. 1999, Application Note 39.

Altera "MAX 7000 Programmable Logic Device Family Data Sheet," May 1999.

Ghosh-Dastidar, J., et al., "A Rapid and calable Diagnosis Scheme for BIST Environments With a Large Number of Scan Chains," Proc. Of IEEE VLSI Test Symposium, pp. 79-85 (2000).

Ghosh-Dastidar, J., et al., "Fault Diagnosis in Scan-Based BIST using Both Time and Space Information," Proc. Of International Test Conference., IEEE, pp. 95-102 (1999).

McAnney, M.G., et al., "There is information in Faulty Signatures," Proc. Of International Test Conf., IEEE, pp. 630-636 (1987).

"Triscend E5 Configurable System-on-Chip Family," Product Description from Triscend Corporation, Jan. 2000 (Version 1.00), pp. i-ii and 1-90.

"Motorola Technical Developments," Magazine of Motorola, Inc., vol. 39, Sep. 1999, pp. i-vii and 77-80.

"AT94K Series Field Programmable System Level Integrated Circuit," Advance Information Brochure of Atmel Corporation, Dec. 1999, 6 pages.

"CS2000 Reconfigurable Communications Processor Family Product Brief," Advance Product Information from ChameleonSystems, Inc., 2000, pp. 1-8.

"Wireless Base Station Design Using Reconfigurable Communications Processors," Wrieless Base Station White paper from ChameleonSystems, Inc., 2000, pp. 1-8.

* cited by examiner

I/O CIRCUITRY SHARED BETWEEN PROCESSOR AND PROGRAMMABLE LOGIC PORTIONS OF AN INTEGRATED CIRCUIT

CROSS-REFERENCES TO RELATED APPLICATIONS

This application is a continuation of U.S. patent application Ser. No. 10/936,878, filed Sep. 8, 2004 (now U.S. Pat. No. 6,980,024), which is a continuation of U.S. patent application Ser. No. 09/880,458, filed Jun. 12, 2001 (now U.S. Pat. No. 6,803,785), which claims the benefit of U.S. provisional application No. 60/211,094, filed Jun. 12, 2000. All of these prior applications are hereby incorporated by reference herein in their entireties.

BACKGROUND OF THE INVENTION

The present invention relates to programmable logic integrated circuits with an embedded processor. More specifically, the present invention relates to input/output (I/O) circuitry that is shared between a processor portion and a programmable logic portion of the integrated circuit.

Previously known integrated circuits (or chips) such as field programmable gate arrays (FPGAs) and programmable logic devices (PLDs) have provided I/O (input/output) pins that provide external access to circuits on the chip. Certain integrated circuits may require a large number of I/O pins on the chip to provide support to the internal circuitry and to provide the desired functionality and versatility. I/O pins and associated circuitry can take up a significant amount of room on the chip. Furthermore, integrated circuit technology continues to advance, and it is possible and desirable to provide more functionality on an integrated circuit. More I/O pins are generally needed to access or otherwise accommodate the additional on-chip functionality.

As an increasing number of I/O pins are required to be placed on a chip, chips must be made larger to accommodate the additional I/O pins. It may be undesirable to use chips with large surface areas in certain applications in which board space is limited. Also, packages that house chips typically accommodate a fixed number of I/O pins. There may be only a limited number of package sizes (e.g., 100 pins, 250 pins, 500 pins, and so forth). These may be "standard" available package sizes. Therefore, when a chip exceeds the maximum number of I/O pins that a particular package size can accommodate, the chip must be housed in the next larger package size. This can significantly increase the cost of manufacturing the chip.

Therefore, there is a need for circuitry and methods that reduce or limit the number of I/O pins on a programmable logic chip.

BRIEF SUMMARY OF THE INVENTION

The present invention is a programmable logic integrated circuit having a programmable logic portion and an embedded processor portion. The programmable logic and embedded processor portions are coupled together so data from one portion may be transferred to the other portion and visa versa. The programmable logic integrated circuit includes I/O pins that are shared by programmable logic and embedded processor portions of the integrated circuit. The embedded processor portion comprises a processor and associated logic and memory circuits. The programmable logic and embedded processor portions can access data signals from and send data signals to the shared I/O pins. The input and output data signals are multiplexed to control access to the shared I/O pins. The multiplexers may be controlled by control signals that determine when particular I/O pins are accessed by the programmable logic portion or the embedded processor portion of the integrated circuit.

By providing shared I/O pins and associated circuitry, the number of additional I/O pins that are required on an integrated circuit with programmable logic and embedded processor portions is limited. The shared I/O circuitry of the present invention also limits the increase in size of a chip when an embedded processor portion is combined with a programmable logic portion on an integrated circuit. The shared I/O circuitry may limit the number of additional pins and chip size enough so that the integrated circuit does not have to be placed in a larger package size.

The circuitry associated with the shared I/O pins on the integrated circuit may be configured to a different I/O standard depending upon whether the I/O pins are accessed by the programmable logic portion or by the embedded processor portion. Control signals that determine an I/O standard are multiplexed by the shared I/O circuitry of the present invention. Input data signals received at the shared I/O pins that are transmitted to the embedded processor portion may be monitored by circuitry within the programmable logic portion to provide debugging features, system wake-up features, etc.

DETAILED DESCRIPTION OF THE PREFERRED EMBODIMENTS

Combining programmable logic, memory, and a processor core, Altera's new Excalibur™ embedded processor solutions allow engineers to integrate an entire system on a single programmable logic device (PLD). The three families—(1) the Nios™ soft core embedded processor, (2) the ARM®-based hard core embedded processor, and (3) the MIPS-based® hard core embedded processor—gives users the flexibility of processor cores with the integration of system-on-a-programmable-chip (SOPC) logic.

Excalibur embedded processors can be used in a wide range of applications, from industrial instrumentation to DSL access concentrators. They offer full integration with Altera's APEX™ PLD architecture, and include the Quartus™ development tool, optimized for the Excalibur embedded processor families.

Figure 1:
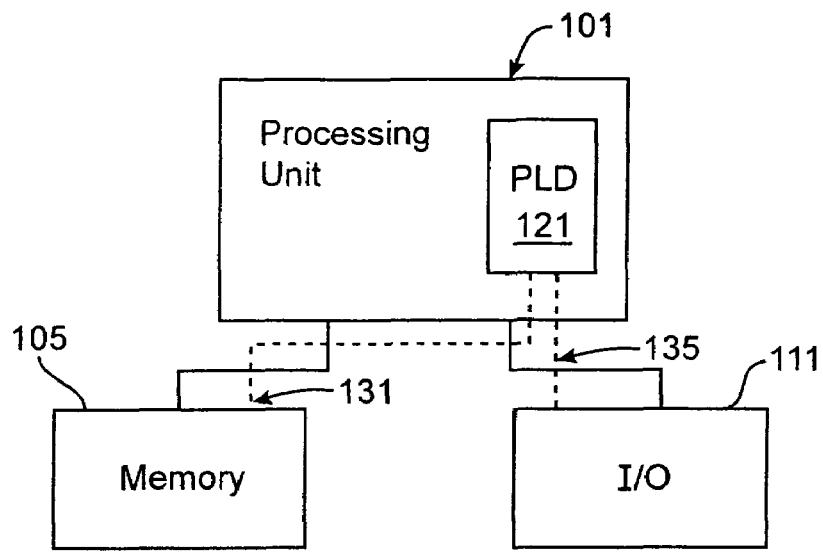
FIG. 1 is diagram of a digital system with a programmable logic integrated circuit.

FIG. 1 shows a block diagram of a digital system within which the present invention may be embodied. The system may be provided on a single board, on multiple boards, or even within multiple enclosures. FIG. 1 illustrates a system 101 in which a programmable logic device 121 may be utilized. Programmable logic devices are sometimes referred to as a PALs, PLAs, FPLAs, PLDs, CPLDs, EPLDs, EEPLDs, LCAs, or FPGAs and are well-known integrated circuits that provide the advantages of fixed integrated circuits with the flexibility of custom integrated circuits. Such devices allow a user to electrically program standard, off-the-shelf logic elements to meet a user's specific needs. See, for example, U.S. Pat. No. 4,617,479, incorporated by reference for all purposes. Programmable logic devices are currently represented by, for example, Altera's MAX®, FLEX®, and APEX™ series of PLDs. These are described in, for example, U.S. Pat. Nos. 4,871,930, 5,241,224, 5,258,668, 5,260,610, 5,260,611, 5,436,575, and the Altera Data Book (1999), all incorporated by reference in their entirety for all purposes. Programmable logic integrated circuits and their operation are well known to those of skill in the art.

In the particular embodiment of FIG. 1, a processing unit 101 is coupled to a memory 105 and an I/O 111 and incorporates a programmable logic device (PLD) 121. PLD 121 may be specially coupled to memory 105 through connection 131 and to I/O 111 through connection 135. The system may be a programmed digital computer system, digital signal processing system, specialized digital switching network, or other processing system. Moreover, such systems may be designed for a wide variety of applications such as, merely by way of example, telecommunications systems, automotive systems, control systems, consumer electronics, personal computers, and others.

Processing unit 101 may direct data to an appropriate system component for processing or storage, execute a program stored in memory 105 or input using I/O 111, or other similar function. Processing unit 101 may be a central processing unit (CPU), microprocessor, floating point coprocessor, graphics coprocessor, hardware controller, microcontroller, programmable logic device programmed for use as a controller, or other processing unit. Furthermore, in many embodiments, there is often no need for a CPU. For example, instead of a CPU, one or more PLDs 121 may control the logical operations of the system. In some embodiments, processing unit 101 may even be a computer system. Memory 105 may be a random access memory (RAM), read only memory (ROM), fixed or flexible disk media, PC Card flash disk memory, tape, or any other storage retrieval means, or any combination of these storage retrieval means. PLD 121 may serve many different purposes within the system in FIG. 1. PLD 121 may be a logical building block of processing unit 101, supporting its internal and external operations. PLD 121 is programmed to implement the logical functions necessary to carry on its particular role in system operation.

Figure 2:
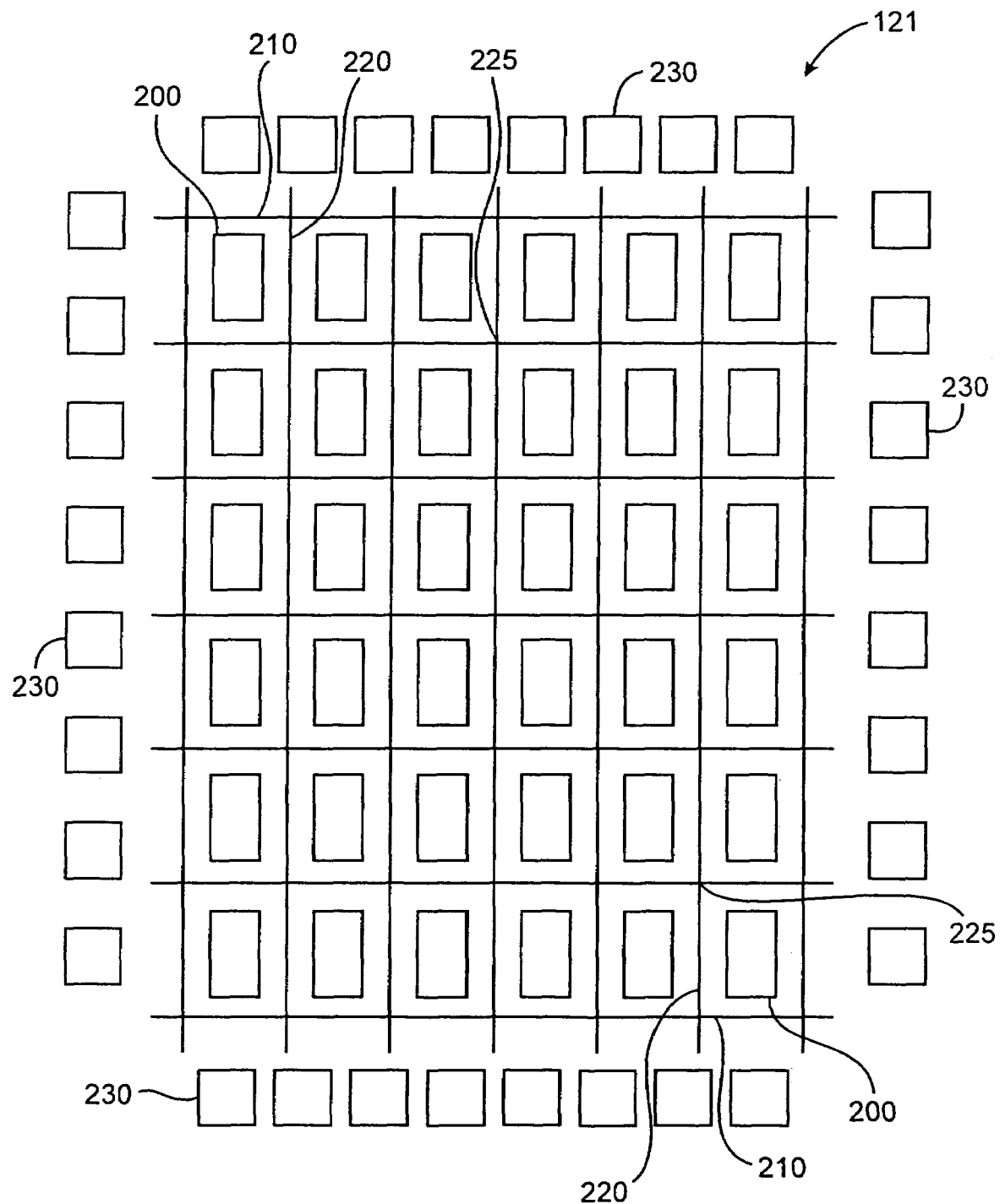
FIG. 2 is a diagram showing an architecture of a programmable logic integrated circuit.

FIG. 2 is a simplified block diagram of an overall internal architecture and organization of PLD 121 of FIG. 1. Many details of PLD architecture, organization, and circuit design are not necessary for an understanding of the present invention and such details are not shown in FIG. 2.

FIG. 2 shows a six-by-six two-dimensional array of thirty-six logic array blocks (LABs) 200. LAB 200 is a physically grouped set of logical resources that is configured to perform logical functions. The internal architecture of a LAB will be described in more detail below in connection with FIG. 3. PLDs may contain any arbitrary number of LABs, more or less than shown in PLD 121 of FIG. 2. Generally, in the future, as technology advances and improves, programmable logic devices with greater numbers of logic array blocks will undoubtedly be created. Furthermore, LABs 200 need not be organized in a square matrix or array; for example, the array may be organized in a five-by-seven or a twenty-by-seventy matrix of LABs.

LAB 200 has inputs and outputs (not shown) which may or may not be programmably connected to a global interconnect structure, comprising an array of global horizontal interconnects (GHs) 210 and global vertical interconnects (GVs) 220. Although shown as single lines in FIG. 2, each GH 210 and GV 220 line may represent a plurality of signal conductors. The inputs and outputs of LAB 200 are programmably connectable to an adjacent GH 210 and an adjacent GV 220. Utilizing GH 210 and GV 220 interconnects, multiple LABs 200 may be connected and combined to implement larger, more complex logic functions than can be realized using a single LAB 200.

In one embodiment, GH 210 and GV 220 conductors may or may not be programmably connectable at intersections 225 of these conductors. Moreover, GH 210 and GV 220 conductors may make multiple connections to other GH 210 and GV 220 conductors. Various GH 210 and GV 220 conductors may be programmably connected together to create a signal path from a LAB 200 at one location on PLD 121 to another LAB 200 at another location on PLD 121. A signal may pass through a plurality of intersections 225. Furthermore, an output signal from one LAB 200 can be directed into the inputs of one or more LABs 200. Also, using the global interconnect, signals from a LAB 200 can be fed back into the same LAB 200. In specific embodiments of the present invention, only selected GH 210 conductors are programmably connectable to a selection of GV 220 conductors. Furthermore, in still further embodiments, GH 210 and GV 220 conductors may be specifically used for passing signal in a specific direction, such as input or output, but not both.

In other embodiments, the programmable logic integrated circuit may include special or segmented interconnect that is connected to a specific number of LABs and not necessarily an entire row or column of LABs. For example, the segmented interconnect may programmably connect two, three, four, five, or more LABs.

The PLD architecture in FIG. 2 further shows at the peripheries of the chip, input-output drivers 230. Input-output drivers 230 are for interfacing the PLD to external, off-chip circuitry. FIG. 2 shows thirty-two input-output drivers 230; however, a PLD may contain any number of input-output drivers, more or less than the number depicted. Each input-output driver 230 is configurable for use as an input driver, output driver, or bidirectional driver. In other embodiments of a programmable logic integrated circuit, the input-output drivers may be embedded with the integrated circuit core itself. This embedded placement of the input-output drivers may be used with flip chip packaging and will minimize the parasitics of routing the signals to input-output drivers.

Figure 3:
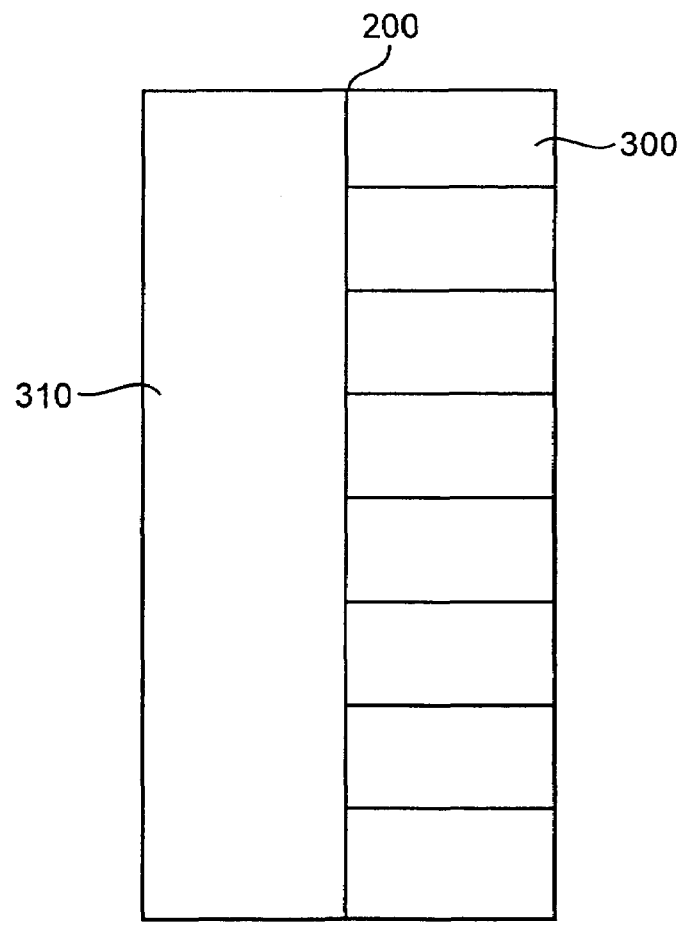
FIG. 3 is a simplified block diagram of a logic array block (LAB)

FIG. 3 shows a simplified block diagram of LAB 200 of FIG. 2. LAB 200 is comprised of a varying number of logic elements (LEs) 300, sometimes referred to as "logic cells," and a local (or internal) interconnect structure 310. LAB 200 has eight LEs 300, but LAB 200 may have any number of LEs, more or less than eight.

A general overview of LE 300 is presented here, sufficient to provide a basic understanding of the present invention. LE 300 is the smallest logical building block of a PLD. Signals external to the LAB, such as from GHs 210 and GVs 220, are programmably connected to LE 300 through local interconnect structure 310. In one embodiment, LE 300 of the present invention incorporates a function generator that is configurable to provide a logical function of a number of variables, such a four-variable Boolean operation. As well as combinatorial functions, LE 300 also provides support for sequential and registered functions using, for example, D flip-flops.

LE 300 provides combinatorial and registered outputs that are connectable to the GHs 210 and GVs 220, outside LAB 200. Furthermore, the outputs from LE 300 may be internally fed back into local interconnect structure 310; through local interconnect structure 310, an output from one LE 300 may be programmably connected to the inputs of other LEs 300, without using the global interconnect structure's GHs 210 and GVs 220. Local interconnect structure 310 allows short-distance interconnection of LEs, without utilizing the limited global resources, GHs 210 and GVs 220.

Figure 4:
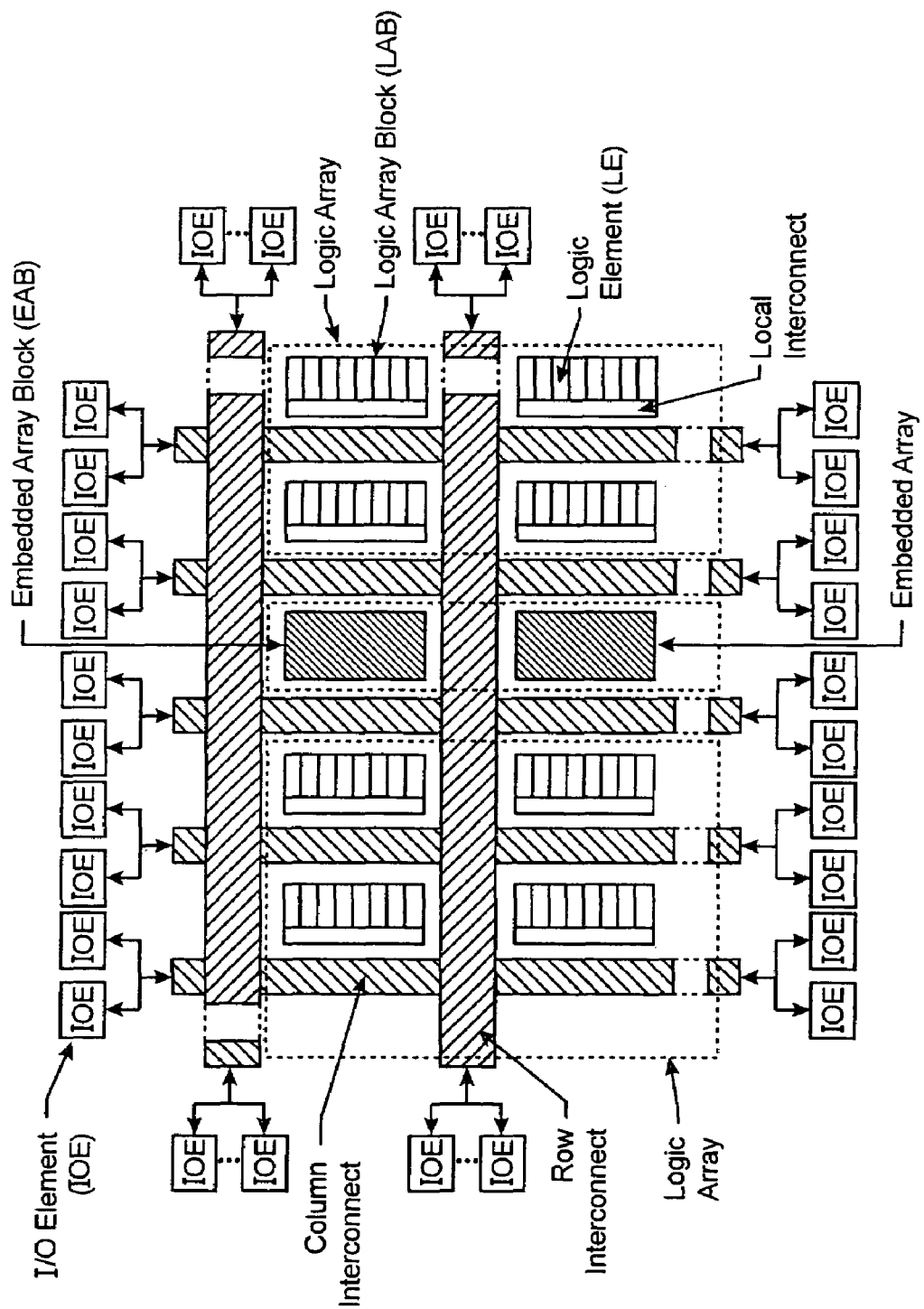
FIG. 4 shows an architecture of a programmable logic integrated circuit with embedded array blocks (EABs)

FIG. 4 shows a PLD architecture similar to that in FIG. 2. The architecture in FIG. 4 further includes embedded array blocks (EABs). EABs contain user memory, a flexible block of RAM. More discussion of this architecture may be found in the *Altera Data Book* (1999) in the description of the FLEX 1OK product family and also in U.S. Pat. No. 5,550,782, which are incorporated by reference.

Figure 5:
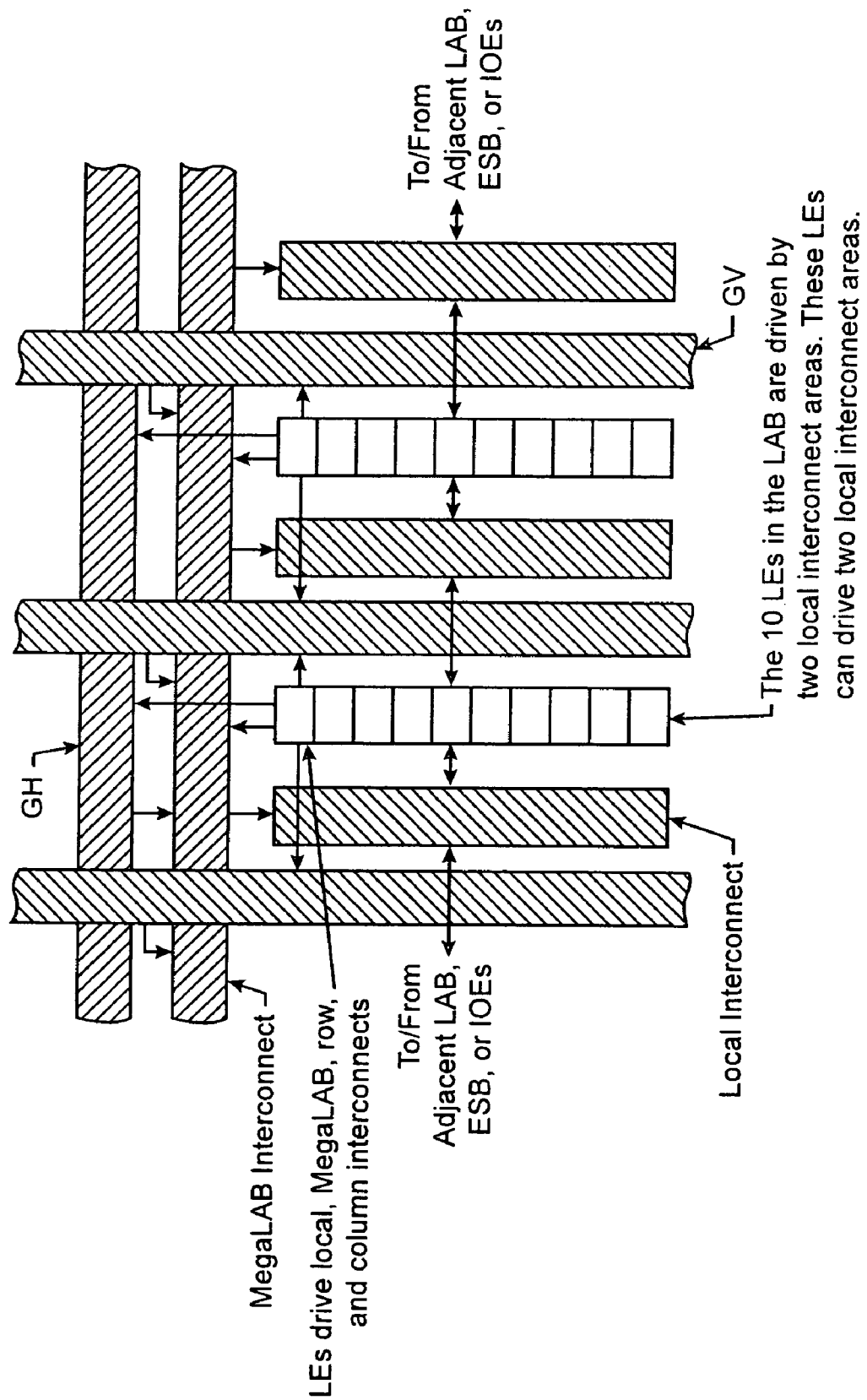
FIG. 5 shows an architecture of a programmable logic integrated circuit with megaLABs.

FIG. 5 shows a further embodiment of a programmable logic integrated circuit architecture. FIG. 5 only shows a portion of the architecture. The features shown in FIG. 5 are repeated horizontally and vertically as needed to create a PLD of any desired size. In this architecture, a number of LABs are grouped together into a megaLAB. In a specific embodiment, a megaLAB has sixteen LABs, each of which has ten LEs. There can be any number of megaLABs per PLD. A megaLAB is programmably connected using a megaLAB interconnect. This megaLAB interconnect may be considered another interconnect level that is between the global interconnect and local interconnect levels. The megaLAB interconnect can be programmably connected to GVs, GHs, and the local interconnect of each LAB of the megaLAB. Compared to the architecture of FIG. 2, this architecture has an additional level of interconnect, the megaLAB interconnect. Such an architecture is found in Altera's APEX™ family of products, which is described in detail in the *APEX 20K Programmable Logic Device Family Data Sheet* (November 1999), which is incorporated by reference. In a specific implementation, a megaLAB also includes an embedded system block (ESB) to implement a variety of memory functions such as CAM, RAM, dual-port RAM, ROM, and FIFO functions.

In an aspect of the present invention, an integrated circuit includes on the same semiconductor substrate a programmable logic portion and an embedded processor portion. The embedded processor portion may also be referred to as the embedded logic portion. The programmable logic portion includes features as discussed above. In a particular implementation, the programmable logic portion of the integrated circuit is similar to the APEX 20K architecture, and in particular the APEX 20K1000E device. The embedded processor portion of the integrated circuit may include a processor core (e.g., an ARM922T processor, or a MIPS4kc processor), and on-chip single and dual-port memories together with other IP (e.g., SDRAM controller, Flash interface, interrupt controller, watchdog timer, timers, UART, PLD interfaces, etc.) The processor core may have a JTAG/debug external interface. The integrated circuit may include external bus interface can interface to external devices. The UART can interface with a serial port.

One technique of implementing a programmable logic integrated circuit of the present invention is to base the programmable logic portion on an existing design and then to add an embedded processor portion. There are some advantages to this technique such as providing a programmable logic design that customers are already familiar with and that can be used with existing software. Further, a programmable logic integrated circuit with an embedded processor portion may be more easily and quickly implemented by simply taking an existing programmable logic design and adding an embedded processor portion. Furthermore, another advantage is that the embedded processor portion may be incorporated into any programmable logic design, such as those of Altera, Xilinx, or Lattice to easily and quickly create a programmable logic integrated circuit with a processor.

When an embedded processor portion is added to an existing programmable logic design (such as one of the APEX devices) on the same integrated circuit chip, the chip must be enlarged to accommodate the embedded processor portion. The embedded processor portion requires I/O pins which also increase the surface area of the chip. If additional pins are added to support the embedded processor portion, the resulting chip may be too large to fit in the same package size as the original programmable logic chip. Using larger package sizes is generally undesirable, because it can significantly increase the cost of manufacturing the chip.

The shared I/O circuitry of the present invention includes I/O pins that can be accessed by either the embedded processor portion or the programmable logic portion of the chip. The shared I/O circuitry of the present invention limits the number of additional I/O pins that need to be placed on the chip for the embedded processor portion, and limits the total size of the chip. An integrated circuit with the shared I/O circuitry of the present invention may fit into a smaller package than a chip with embedded processor and programmable logic portions that does not have shared I/O circuitry. Therefore, the present invention can provide significant cost savings in the manufacturing process.

Figure 6:
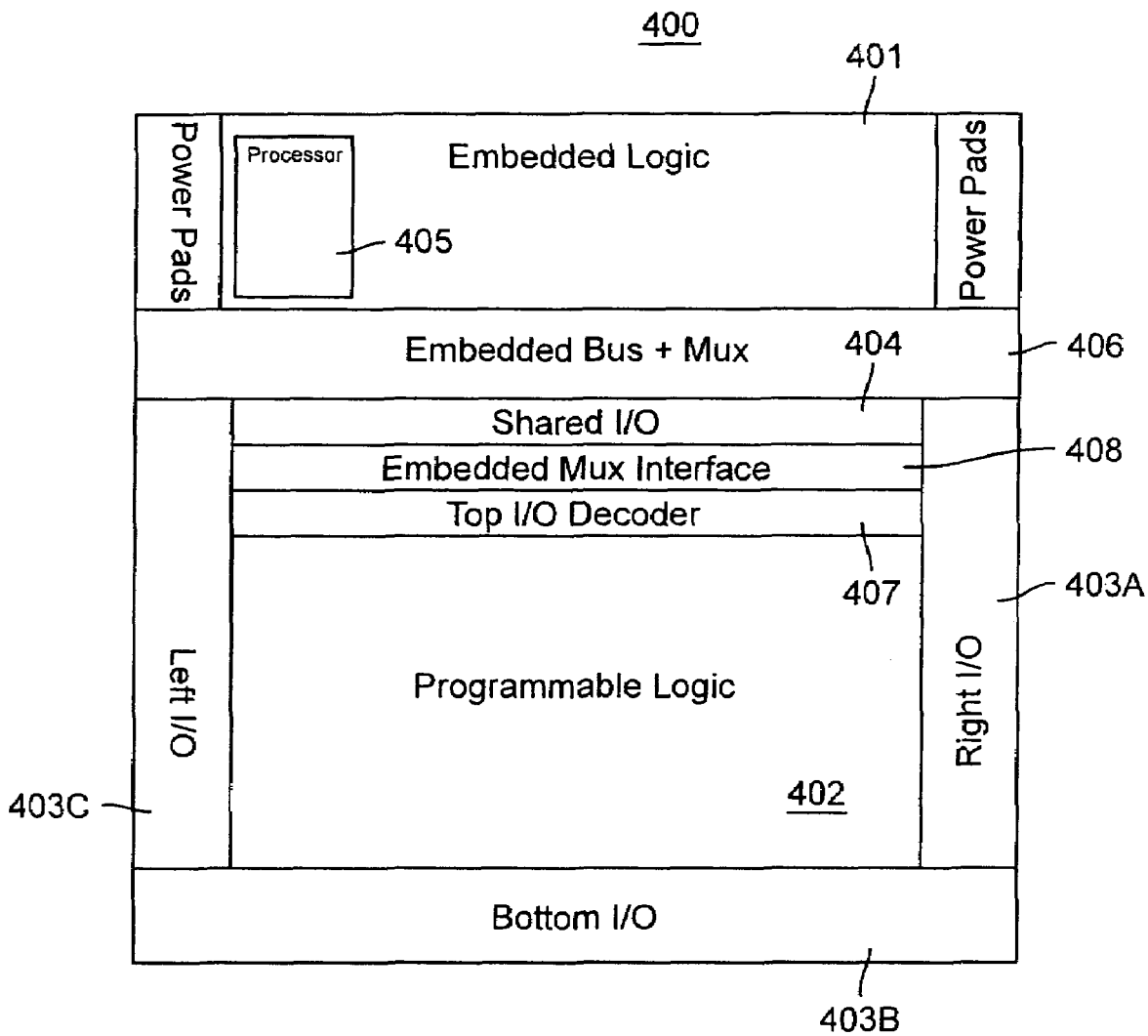
FIG. 6 is a diagram of a chip comprising embedded logic, a programmable logic device, and shared I/O circuitry in accordance with the principles of the present invention.

An integrated circuit chip comprising a programmable logic portion, an embedded processor portion, and shared I/O circuitry in accordance with the principles of the present invention is shown in FIG. 6. Chip 400 includes programmable logic portion 402 and embedded processor portion 401, which includes processor 405 and associated memory and logic circuits in section 401. Portion 402 is adjacent to I/O pins in regions 403A-C that are accessible by circuitry in portion 402, but are not accessible by circuitry in portion 401. Chip 400 includes shared I/O portion 404 which includes I/O pins and associated circuitry that may be accessed by circuitry in portion 402 or by circuitry in embedded processor portion 401. Embedded processor portion 401 may be easily added to an existing programmable logic design embodied in portion 402 by adding portion 401 to the periphery of the layout as shown in FIG. 6.

Top I/O decoder portion 407 decodes signals passing between the shared I/O pins in region 404 and circuitry in programmable logic portion 402. Embedded MUX interface 408 and embedded Bus and MUX portion 406 include multiplexers that select signals lines from programmable logic portion 402 or embedded processor portion 401 to be coupled to the shared I/O pins in section 404. Shared I/O pins in section 404 and associated circuitry advantageously limits the number of I/O pins on chip 400.

The shared I/O circuitry in portion 404 includes I/O pins that provide access to signals from external circuits. The shared I/O circuitry also includes circuitry that drives signals sent to and from the shared I/O pins and circuitry that controls the I/O transfer standards of signals that are applied to the shared I/O pins. Both of these are discussed in further detail below.

The shared I/O pins are accessible by the programmable logic and the embedded processor portions of the chip. If the shared I/O pins are not being used by the embedded processor portion, then they may be accessed by the programmable logic portion to augment the I/O pins in regions 403A-403C that are dedicated to programmable logic portion 402. If desired, embedded processor portion 401 may include dedicated I/O pins that are only accessible by processor 405.

Figure 7:
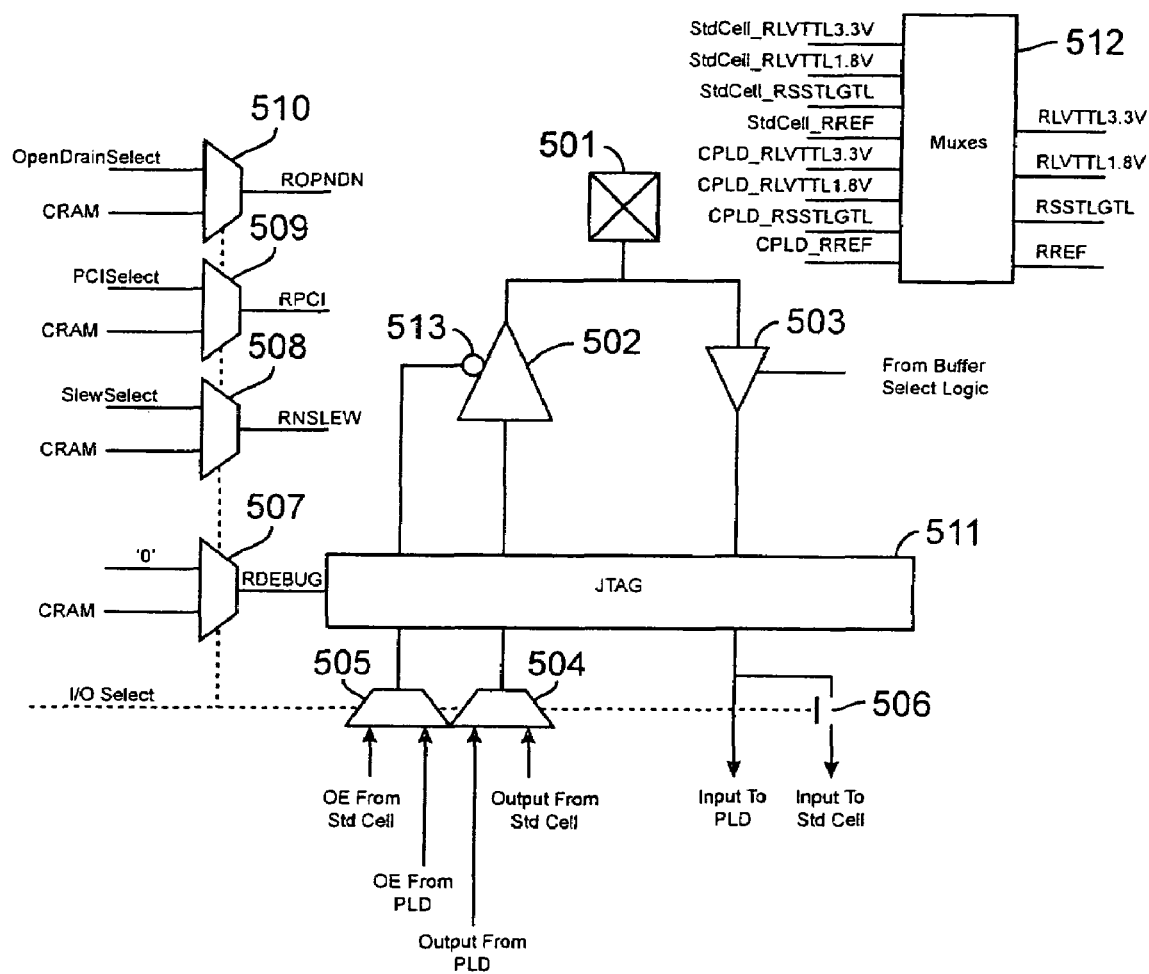
FIG. 7 is a more detailed diagram of shared I/O circuitry in accordance with the principles of the present invention.

A detailed diagram of an embodiment of the shared I/O circuitry of the present invention is shown in FIG. 7. Shared I/O portion 404 of chip 400 includes numerous I/O pins and associated circuitry. One such shared I/O pin is shown in FIG. 7 for purposes of illustration. Signals can be driven on to shared I/O pin 501 through driver circuit 502 from programmable logic portion 402 or embedded processor portion 401. Embedded processor portion 401 is also referred to as the standard cell. The IOSelect signal determines when I/O pin 501 can be accessed by circuits in embedded processor portion 401 and when it can be accessed by circuits in programmable logic portion 402.

Processor 405 can gain access to the shared I/O pins by writing to a register, which determines the state of IOSelect. Processor 405 can set IOSelect so that it-gains access to I/O pins in shared I/O region 404. When processor 405 does not need to use I/O pins in region 404, IOSelect indicates that these I/O pins are accessible by programmable logic portion 402.

IOSelect is coupled to the select input terminals of multiplexers 504-505 and 507-510. When the value of the IOSelect signal indicates that the embedded processor portion 401 needs to access I/O pin 501, multiplexer 505 couples the output enable signal from the embedded processor portion (i.e., OE from Std Cell) to the output of multiplexer 505, and multiplexer 504 couples the data output signal from the embedded processor portion (i.e. output from Std Cell) to the output of multiplexer 504. When the value of the IOSelect signal indicates that the embedded processor portion does not need to access I/O pin 501, multiplexer 505 couples the output enable signal from the programmable logic portion 402 (i.e., OE from PLD) to the output of multiplexer 505, and multiplexer 504 couples the data output signal from the programmable logic portion 402 to the output of multiplexer 504.

The output terminals of multiplexers 504 and 505 are coupled to JTAG circuit 511. JTAG circuit 511 may be used to perform testing and debugging functions on signals sent to and from the embedded processor and programmable logic portions. Further details of the operation of JTAG circuitry are discussed in "IEEE 1149.1 (JTAG) Boundary-Scan Testing in Altera Devices," Application Note 39, August 1999, pp. 1-29, which is incorporated by reference in its entirety for all purposes.

The output enable signal selected by multiplexer 505 is passed through JTAG circuit 511 to the tri-state input 513 of tri-state driver 502, and the data signal selected by multiplexer 504 is passed through JTAG circuit 511 to the data input of driver 502. The output enable signal from the programmable logic portion 402 or the embedded processor portion 401 causes tri-state driver 502 to be ON or OFF. Thus, the output enable signals determine when output data signals from the programmable logic portion 402 or from the embedded processor portion 401 are coupled to or decoupled from I/O pin 501.

Signals that are applied to I/O pin 501 from external sources are driven into chip 400 through driver circuit 503. A signal from the Buffer Select Logic selects an input standard for driver circuit 503. When driver circuit 503 is enabled, external signals applied to I/O select pin 501 are driven from driver 503 through JTAG circuitry 511 as inputs into portion 402 (Input to PLD) or portion 401 (input to Std Cell) as shown in FIG. 7. JTAG circuit 511 may perform testing and debugging functions on input signals applied to the shared I/O pins such as pin 501.

External signals applied to I/O pin 501 may be driven as inputs into portion 401 (i.e., Input to Std Cell) when switch 506 is ON. Switch 506 may be, for example, a transistor such as a MOSFET. Switch 506 is turned ON and OFF by the IOSelect signal. Thus, the IOSelect signal controls when signals are driven from portions 401 or 402 onto pin 501 as chip outputs, and when signals are driven from pin 501 into portions 401 and 402 as chip inputs.

External signals applied to external I/O pin 501 are always driven into the PLD when driver circuit 503 is enabled in the embodiment shown in FIG. 7. This feature allows input signals that are driven into embedded processor portion 401 or output signals to be monitored or "snooped" by circuits in programmable logic portion 402 to perform various functions. For example, circuits in programmable logic portion 402 may monitor input signals received on pin 501 that are sent to embedded processor portion 401 (i.e., switch 506 ON) to perform debugging functions by providing an output signal when a trigger point is reached.

As another example, circuitry in programmable logic portion 402 may monitor inputs to embedded processor portion 401 from the shared I/O pins such as pin 501 to provide system wakeup when certain signals patterns are received on the I/O pins. Circuitry in programmable logic portion 402 can monitor signals received at the I/O pins to determine when a pattern indicative of an event that indicates the onset of higher power state occurs. That circuitry in programmable logic portion 402 may then send a signal to processor 405 causing it to exit the current standby mode and to return to a higher power state. If desired, a switch such as a transistor coupled to IOSelect may be placed in series with the input to programmable logic portion 402 from the shared I/O pins such as pin 501. This switch is switched out of phase with switch 506 by IOSelect and is used to block the programmable logic portion snooping feature previously discussed.

The shared I/O circuitry of the present invention is configured to an I/O standard that is determined by signals ROPNDRN, RPCI, and RNSLEW shown in FIG. 7. Signals ROPNDRN, RPCI, and RNSLEW are coupled to the appropriate control signals from either programmable logic portion 402 or embedded processor portion 401 depending upon which portion of the chip accesses I/O pin 501.

The shared I/O pins in region 404 of the chip may be accessible in groups or banks such that signals ROPNDRN, RPCI, and RNSLEW can activate I/O standards for an entire group or bank of shared I/O pins at once. For example, a group of shared I/O pins that are used to interface to an SDRAM controller may require the same I/O standard. These shared I/O pins may be enabled for use by embedded processor portion 401 at the same time. Instead of providing a set of I/O standard control signals for each individual shared I/O pin, it may be desirable to provide one set of control signals to the entire group of shared I/O pins.

Programmable logic portion 402 and embedded processor portion 401 of chip 400 each output a plurality of control signals which are designed to configure the shared I/O pins to an appropriate I/O standard. For processor applications, large blocks of I/O pins are normally required to be configured to the same I/O standard. Therefore, processors typically can configure large blocks of I/O pins in groups by providing a single shared signal. For example, the OpenDrainSelect signal, PCISelect signal, and the SlewSelect signal are control signals from embedded processor portion 401, which each configure groups of the shared I/O pins that are accessed by circuitry in embedded processor portion 401 (including processor 405).

With respect to programmable logic applications, each I/O pin typically needs to be configured on an individual basis. For example, the CRAM signals shown in FIG. 7 are a plurality of unique control signals from programmable logic portion 402 that individually configure each of the shared I/O pins that are accessed by circuitry in programmable logic portion 402.

The IOSelect signal indicates whether programmable logic portion 402 or embedded processor portion 401 accesses I/O pin 501 by controlling multiplexers 504-505 and switch 506. IOSelect causes multiplexers 508-510 to couple the CRAM control signals to ROPNDRN, RPCI, and RNSLEW when I/O pin 501 is accessed by programmable logic portion 402. IOSelect causes multiplexers 508-510 to couple OpenDrainSelect, PCISelect, and SlewSelect to ROPNDRN, RPCI, and RNSLEW, respectively, when I/O pin 501 is accessed by embedded processor portion 401.

Signal ROPNDRN can select the open drain standard for I/O pin 501 in response to the selected CRAM or OpenDrainSelect signal. Signal RPCI can select the PCI standard for I/O pin 501 when it is coupled to a PCI bus in response to the selected CRAM or PCISelect signal. Signal RNSLEW selects an appropriate slew rate for the bus coupled to I/O pin 501 in response to the state of the selected CRAM or SlewSelect signal. The Open Drain, PCI, and Slew Rate I/O standards are well known to those of skill in the PLD and microprocessor design art. If desired, other I/O standards may be used to configure the shared I/O circuitry in addition to or instead of the I/O standards discussed.

The RDEBUG signal determines whether JTAG circuitry 511 is enabled or disabled. Multiplexer 507 couples either 0 or a CRAM control signal to the RDEBUG signal in response to the IOSelect signal. When the IOSelect signal indicates that programmable logic portion 402 is to access I/O pin 501, multiplexer 507 couples the appropriate CRAM signal to RDEBUG, which enables or disables JTAG circuitry 511. When the IOSelect signal indicates that embedded processor portion 401 is to access I/O pin 501, multiplexer 507 coupled 0 to RDEBUG, and JTAG circuit 511 is disabled. Therefore, JTAG circuitry 511 is disabled in the embodiment of FIG. 7 when embedded processor portion 401 of the chip accesses the shared I/O pins. If desired, an active control signal from embedded processor portion 401 may be coupled to multiplexer 507 instead to enable JTAG circuitry 511 when embedded processor portion 401 accesses I/O pin 501.

Multiplexers 512 are a series of multiplexers which output signals that determine what I/O standard is being applied and select the appropriate input buffer 503 from Input Buffer Select Logic. For example, when the shared I/O pins are accessed by embedded processor portion 401, an SDRAM controller interface may require a certain reference voltage standard. Certain shared I/O pins are assigned as $V_{REF}$ inputs according to this standard. Multiplexer 512 selects an appropriate reference signal for shared I/O pins that are to be used as $V_{REF}$ inputs in this mode only.

A reference voltage $V_{REF}$ from a shared I/O pin may be provided to a differential input of a comparator. The other input of the comparator is driven by an input signal. The $V_{REF}$ reference voltage determines if the required input signal is a logic LOW or a logic HIGH for certain I/O standards (e.g., SSTL2).

In a further aspect of the present invention, shared I/O circuitry between the programmable logic and embedded logic portions may be used in various operational modes. Some example operational modes for chip 400 include Boot from Flash Mode, Reset Mode, Normal Configuration mode, and Toggle Mode. Other operational modes may also be used with the shared I/O circuitry of the present invention. The various operational modes discussed herein address the issue of how to access the processor using the shared I/O pins of the present invention.

Reset mode is a default state during power up of the chip in which IOSelect is set so that all of the I/O pins in shared I/O portion 404 are coupled to received output signals from programmable logic portion 402 and to send input signals to programmable logic portion 402. Boot from Flash mode is an example of a startup mode for chip 400. In Boot from Flash mode, after Reset mode embedded processor portion 401 accesses an external Flash interface for it's boot code (e.g., using shared I/O pins). The Flash interface is required to be accessed immediately after Reset mode in-Boot from Flash mode. In other modes, the Flash interface may not be required immediately after Reset mode. The default state of the IOSelect signal controls whether the Flash interface is enabled for use by programmable logic portion 402 or embedded logic portion 401. Dedicated inputs are provided that determine the initial modes of operation (e.g., Boot from Flash, Normal Configuration, etc.). Signals on these pins that are sampled during Reset mode determine the state of the register that drives the IOSelect signal for the Flash interface immediately after de-assertion of Reset mode.

In Normal configuration mode, the shared I/O circuitry of the present invention (or other non-shared I/O pins) may be used as access pins to configure logic circuits, memory, etc. within chip portions 401 and 402. Certain banks of shared I/O pins may be used to configure circuits in embedded processor portion 401, and other banks of shared I/O pins may be used to configure circuits in programmable logic portion 402.

In a further embodiment of the present invention, the use of the shared I/O pins may be dynamically toggled between programmable logic portion 402 and embedded processor portion 401 in a Toggle Mode. Input signal streams received at pin 501 may be alternately driven as input signals to programmable logic portion 402 and embedded processor portion 401. External signals received at I/O pin 501 may be dynamically toggled to embedded processor portion 402 by switching switch 506 ON and OFF in response to IOSelect. External signals received at I/O pin 501 may be continuously received by circuitry in programmable logic portion 402 (or toggled to programmable logic portion 402 by placing a switch coupled to the IOSelect signal in series with the input to the programmable logic from pin 501). Monitoring circuity in programmable logic portion 402 may monitor signals sent as inputs to embedded processor portion 401 from pin 501 to perform debugging and other functions. The monitoring circuitry in programmable logic portion 402 may sense the state of the IOSelect signal to determine when signals received on pin 501 are intended to be data inputs to programmable logic portion 402.

In addition, output signals from programmable logic portion 402 and from embedded processor portion 401 may be dynamically toggled as output signals driven onto output pin 501. In general, an output signal is transmitted to pin 501 from only one source at a time: either programmable logic portion 402 or embedded processor portion 401. IOSelect can toggle multiplexers 504-505 to dynamically drive output signals from programmable logic portion 402 and from embedded processor portion 401 onto pin 501. Output signals from programmable logic portion 402 and embedded processor portion 401 can be concatenated into a continuous output stream received at pin 501.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth. Therefore, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention will include all embodiments and equivalents falling within the scope of the claims.

What is claimed is:

1. An integrated circuit having an edge and a middle portion disposed within the edge, the integrated circuit comprising:
    a programmable logic portion;
    a processor; and
    input/output (I/O) circuitry comprising a plurality of I/O pins, the (I/O) circuitry disposed in the middle portion, wherein at least some of the pins in the middle portion are accessible by the programmable logic portion and the processor.

2. The integrated circuit of claim 1, further comprising:
    circuitry for selectively routing signals to, from, and/or between (a) the pins in the middle portion, and (b) one of (1) the programmable logic portion, and (2) the processor.

3. The integrated circuit of claim 1, further comprising:
    circuitry for selectively routing signals from the pins in the middle portion to the programmable logic portion and the processor.

4. The integrated circuit of claim 1, further comprising:
    circuitry for selectively routing signals from the programmable logic portion and the processor to the pins in the middle portion.

5. The integrated circuit of claim 1, wherein the programmable logic portion and the processor share access to the pins in the middle portion.

6. The integrated circuit of claim 1, further comprising:
    JTAG circuitry coupled to the I/O circuitry.

7. The integrated circuit of claim 1, wherein I/O circuitry is disposed on a portion of the edge.

8. An integrated circuit comprising:
    a programmable logic portion;
    a processor;
    input/output (I/O) circuitry that is accessible by the programmable logic portion and the processor, the I/O circuitry comprising a plurality of I/O pins disposed in a middle portion of the integrated circuit; and
    circuitry for interconnecting the programmable logic portion and the processor to the I/O pins that are disposed in the middle portion.

9. A method for transmitting signals to and from an integrated circuit, the method comprising:
    providing I/O circuitry access to (a) a programmable logic portion and (b) a processor, the I/O circuitry comprising a plurality of I/O pins and being disposed in a middle portion of the integrated circuit; and
    selectively transmitting signals between (a) the I/O pins, and (b) the programmable logic portion and the processor.

10. The method of claim 9, wherein selectively transmitting signals comprises:
    transmitting the signals from the I/O pins to the processor.

11. The method of claim 9, wherein selectively transmitting signals comprises:
    transmitting the signals from the I/O pins to the programmable logic portion.

12. The method of claim 9, wherein selectively transmitting signals comprises:
    transmitting the signals from the processor to the I/O pins.

13. The method of claim 9, wherein selectively transmitting signals comprises:
    transmitting the signals from the programmable logic portion to the I/O pins.

14. A method of operating an integrated circuit comprising a programmable logic portion, a processor portion having a processor, and I/O pins that are accessible by the programmable logic portion and the processor portion, the method comprising:
    selectively transmitting input signals received at the I/O pins to the programmable logic portion and the processor portion; and
    selectively transmitting output signals from the programmable logic portion and the processor portion to the I/O pins.

* * * * *